US010003224B2

(12) United States Patent
Jang et al.

(10) Patent No.: US 10,003,224 B2
(45) Date of Patent: Jun. 19, 2018

(54) MOTOR ASSEMBLY FOR WASHING MACHINE

(71) Applicant: NEW MOTECH CO., LTD., Gwangju (KR)

(72) Inventors: Jeong Cheol Jang, Gwangju (KR); Ji Min Lee, Gwangju (KR); Gyeong Sik Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 349 days.

(21) Appl. No.: 14/899,124

(22) PCT Filed: Jun. 2, 2014

(86) PCT No.: PCT/KR2014/004893
§ 371 (c)(1),
(2) Date: Dec. 17, 2015

(87) PCT Pub. No.: WO2015/016478
PCT Pub. Date: Feb. 5, 2015

(65) Prior Publication Data
US 2016/0149447 A1 May 26, 2016

(30) Foreign Application Priority Data

Aug. 1, 2013 (KR) .................. 10-2013-0091379

(51) Int. Cl.
*H02K 1/18* (2006.01)
*H02K 5/10* (2006.01)
(Continued)

(52) U.S. Cl.
CPC ............ *H02K 1/187* (2013.01); *H02K 3/522* (2013.01); *H02K 5/10* (2013.01); *H02K 5/225* (2013.01); *H02K 7/102* (2013.01); *H02K 11/215* (2016.01)

(58) Field of Classification Search
CPC .......... H02K 5/10; H02K 1/187; H02K 3/522; H02K 5/225; H02K 7/102; H02K 11/215; H02K 1/18; H02K 5/22
(Continued)

(56) References Cited

U.S. PATENT DOCUMENTS 6,400,059 B1 * 6/2002 Hsu ................... H02K 1/148
310/254.1
7,615,907 B2 * 11/2009 Fei .................... H02K 1/148
310/216.114
(Continued)

FOREIGN PATENT DOCUMENTS

KR 10-2005-0087280 A 8/2005
KR 10-2008-0004887 A 1/2008
(Continued)

OTHER PUBLICATIONS

International Search Report for PCT/KR2014/004893 dated Sep. 5, 2014 from Korean Intellectual Property Office.

*Primary Examiner* — Naishadh Desai
(74) *Attorney, Agent, or Firm* — Revolution IP, PLLC

(57) ABSTRACT

A motor assembly for a washing machine including: a stator core having teeth formed along the outer peripheral surface; upper and lower insulators coupled to the upper and lower portions of the stator core to surround the top and underside of the stator core; a first fastening rib protruding from the inner peripheral surface of the lower insulator; a second fastening rib protruding from the inner peripheral surface of the upper insulator to be coupled on the underside thereof to the top of the first fastening rib; and a round-shaped third fastening rib having the underside coupled to the top of the second fastening rib and the top protruding from the top of the upper insulator to be coupled to the underside of a housing in which various parts such as a brake drum and the like are mounted.

4 Claims, 3 Drawing Sheets

(51) Int. Cl.
    *H02K 3/52* (2006.01)
    *H02K 5/22* (2006.01)
    *H02K 7/102* (2006.01)
    *H02K 11/215* (2016.01)

(58) Field of Classification Search
    USPC .................................................. 310/71, 67 R
    See application file for complete search history.

(56) References Cited

U.S. PATENT DOCUMENTS

| | | | |
|---|---|---|---|
| 9,306,435 B2* | 4/2016 | Jang | H02K 11/215 |
| 2005/0040715 A1* | 2/2005 | Nesic | H02K 11/38 |
| | | | 310/71 |
| 2005/0189836 A1* | 9/2005 | Lee | D06F 37/304 |
| | | | 310/215 |
| 2008/0129131 A1 | 6/2008 | Shin et al. | |
| 2013/0036773 A1* | 2/2013 | Choi | D06F 37/40 |
| | | | 68/140 |
| 2013/0111676 A1* | 5/2013 | Jun | H02K 21/12 |
| | | | 8/137 |
| 2013/0278094 A1* | 10/2013 | Peterson | H02K 1/187 |
| | | | 310/64 |

FOREIGN PATENT DOCUMENTS

| | | |
|---|---|---|
| KR | 10-0845852 B1 | 7/2008 |
| KR | 10-2011-0018017 A | 2/2011 |
| KR | 10-2013-0017882 A | 2/2013 |
| KR | 10-1264569 B1 | 5/2013 |

\* cited by examiner

[Fig. 1]
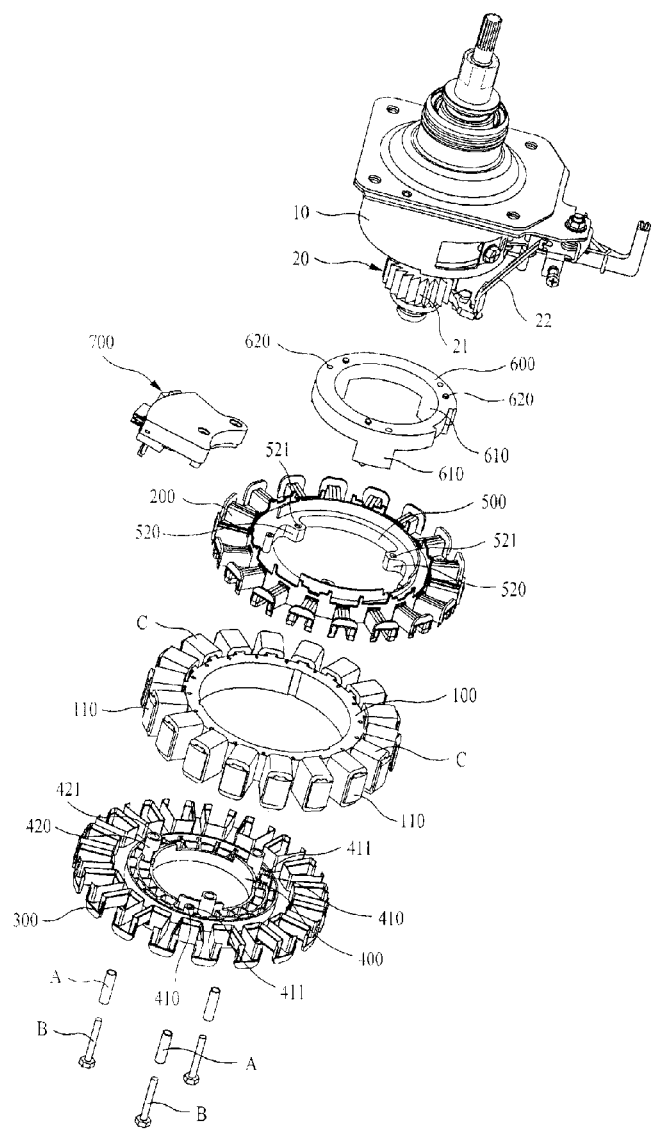

[Fig. 2]
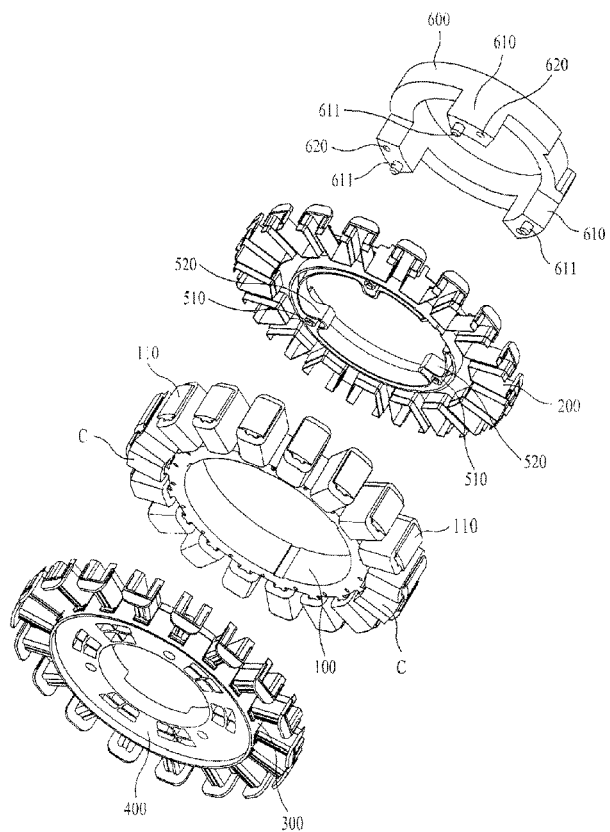
[Fig. 3]
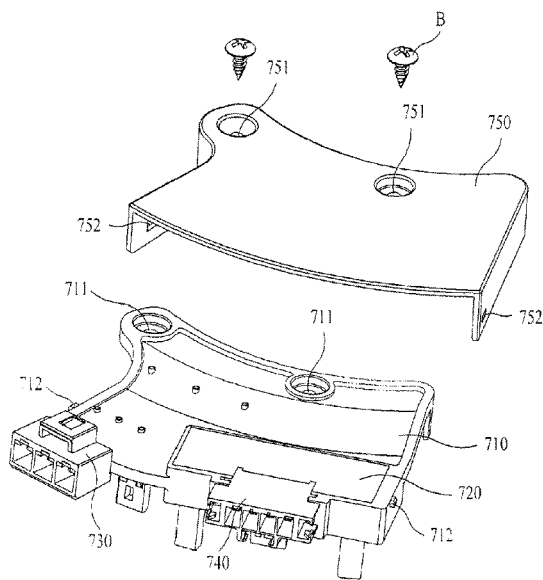

[Fig. 4]
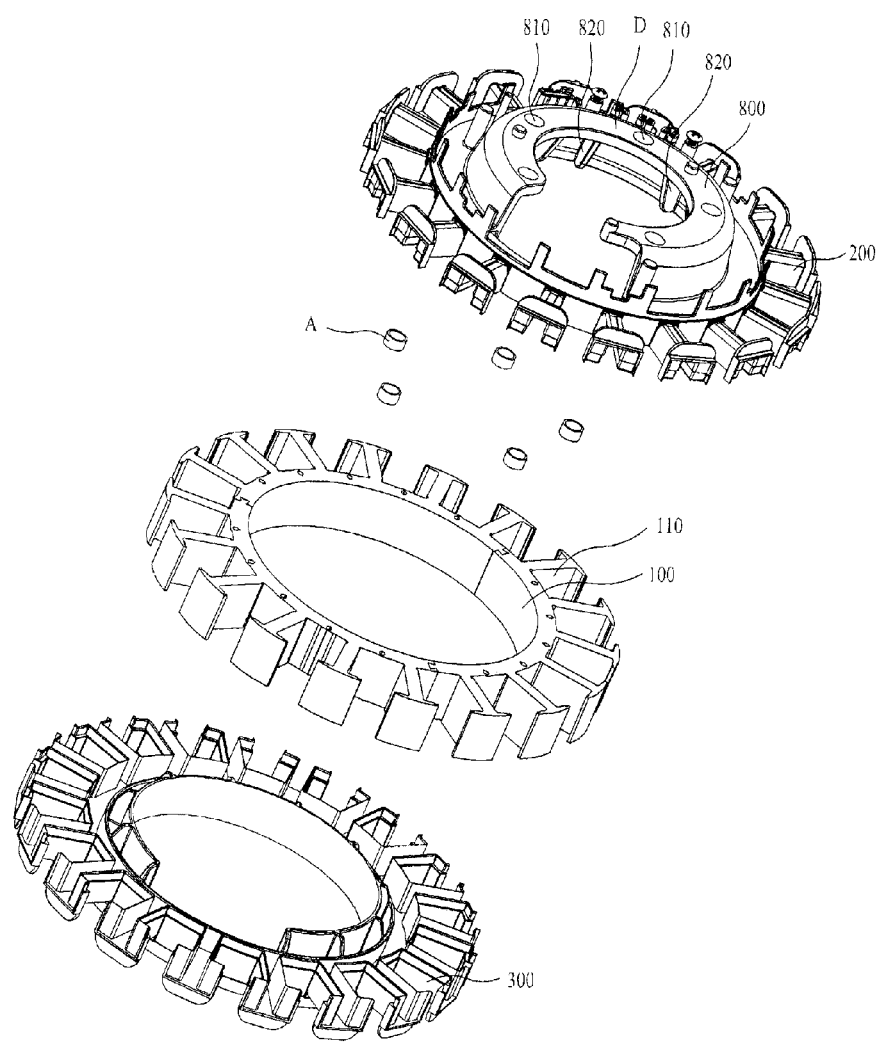

MOTOR ASSEMBLY FOR WASHING MACHINE

CROSS REFERENCE TO PRIOR APPLICATIONS

This application is a National Stage Application of PCT International Patent Application No. PCT/KR2014/004893 filed on Jun. 2, 2014, under 35 U.S.C. § 371, which claims priority to Korean Patent Application No. 10-2013-0091379 filed on Aug. 1, 2013, which are all hereby incorporated by reference in their entirety.

TECHNICAL FIELD

The present invention relates to a motor assembly for a washing machine, and more particularly, to a motor assembly for a washing machine that provides a simple assembling process and allows the whole structure of the washing machine to become compact.

BACKGROUND ART

Generally, a washing machine is an electronic appliance that removes pollutants from clothes, bedding and the like through the friction and impacts of the flow of water caused by the emulsification of detergent and the rotation of washing wings, and the washing process of the washing machine generally has washing, rinsing, dewatering and water supplying/discharging strokes.

The washing machine is largely classified into a pulsator type washing machine and a drum type washing machine in accordance with washing ways, and the pulsator type washing machine rotates only the washing wings to form the flow of water in the state where the washing tub stops at the time of the washing and rinsing strokes and rotates the washing wings and the washing tub together at the time of the dewatering stroke to perform the dewatering stroke from the laundry put into the washing tub by using a centrifugal force.

Typically, the washing machine includes a motor assembly, a washing shaft adapted to rotate washing wings, a dewatering shaft adapted to rotate the washing tub, and a clutch unit adapted to selectively transmit a driving force of the motor assembly to the washing shaft and the dewatering shaft in accordance with a washing mode.

According to the conventional washing machine, however, the motor assembly is complicated in structure, thus making it hard to be assembled, and further, the structure for fixing the motor assembly is complicated and bulky, thus making it difficult to reduce the whole size of the washing machine.

DISCLOSURE OF INVENTION

Technical Problem

Accordingly, the present invention has been made in view of the above-mentioned problems occurring in the prior art, and it is an object of the present invention to provide a motor assembly for a washing machine that can be easily assembled by means of fastening ribs and easily coupled to the underside of a housing by means of the fastening ribs.

It is another object of the present invention to provide a motor assembly for a washing machine that can locate a clutch assembly at the inside thereof when coupled to the underside of a housing, thus permitting the whole structure of the washing machine to become compact.

It is yet another object of the present invention to provide a motor assembly for a washing machine that can cover the top of a sensor cover with a sensor cap, thus previously preventing water from entering a hall sensor and a power connector.

Solution to Problem

To accomplish the above-mentioned objects, according to a first aspect of the present invention, there is provided a motor assembly for a washing machine including: a stator core having a plurality of teeth formed along the outer peripheral surface thereof in such a manner as to wind coils thereon; upper and lower insulators coupled to the upper and lower portions of the stator core in such a manner as to surround the top and underside of the stator core; a first fastening rib protruding from the inner peripheral surface of the lower insulator; a second fastening rib protruding from the inner peripheral surface of the upper insulator in such a manner as to be coupled on the underside thereof to the top of the first fastening rib; and a round-shaped third fastening rib having the underside coupled to the top of the second fastening rib and the top protruding from the top of the upper insulator in such a manner as to be coupled to the underside of a housing in which various parts such as a brake drum and the like are mounted.

To accomplish the above-mentioned objects, according to a second aspect of the present invention, there is provided a motor assembly for a washing machine including: a stator core having a plurality of teeth formed along the outer peripheral surface thereof in such a manner as to wind coils thereon; upper and lower insulators coupled to the upper and lower portions of the stator core in such a manner as to surround the top and underside of the stator core; and a fourth fastening rib extended upwardly from the inner peripheral surface of the upper insulator and having a mounting surface formed on the top thereof in such a manner as to be extended horizontally toward the center of the upper insulator by a given length and to mount the underside of a housing in which various parts such as a brake drum and the like are mounted thereon.

To accomplish the above-mentioned objects, according to a third aspect of the present invention, there is provided s motor assembly for a washing machine including: a stator core having a plurality of teeth formed along the outer peripheral surface thereof in such a manner as to wind coils thereon; upper and lower insulators coupled to the upper and lower portions of the stator core in such a manner as to surround the top and underside of the stator core; a sensor cover coupled to one side of the top of the upper insulator; a hall sensor disposed on the top of the sensor cover so as to sense the rotating speed of a rotor; a power connector disposed on one side of the sensor cover in such a manner as to be connected to external power; and a sensor cap covering the top of the sensor cover so as to prevent water from entering the hall sensor and the power connector.

Advantageous Effects of Invention

According to the present invention, the motor assembly for a washing machine can be easily assembled by means of the fastening ribs and easily coupled to the underside of the housing by means of the fastening ribs.

Further, the motor assembly for a washing machine can locate the clutch assembly at the inside thereof when coupled to the underside of the housing, thus permitting the whole structure of the washing machine to become compact.

Additionally, the motor assembly for a washing machine can cover the top of the sensor cover with the sensor cap, thus previously preventing water from entering the hall sensor and the power connector.

BRIEF DESCRIPTION OF DRAWINGS

FIG. 1 is an exploded perspective view showing the whole structure of a motor assembly for a washing machine according to a first embodiment of the present invention.

FIG. 2 is a perspective view showing the underside structures of first to third fastening ribs in the motor assembly for a washing machine according to the first embodiment of the present invention.

FIG. 3 is an exploded perspective view showing a hall sensor assembly in the motor assembly for a washing machine according to the first embodiment of the present invention.

FIG. 4 is an exploded perspective view showing the whole structure of a motor assembly for a washing machine according to a second embodiment of the present invention.

MODE FOR THE INVENTION

Hereinafter, an explanation on a motor assembly for a washing machine according to preferred embodiments of the present invention will be in detail given with reference to the attached drawings. In the description of the present invention, the same parts in the drawings are indicated by identical reference numerals to each other, and therefore, an explanation on them will be avoided separately for the brevity of the description.

FIG. 1 is an exploded perspective view showing the whole structure of a motor assembly for a washing machine according to a first embodiment of the present invention, and FIG. 2 is a perspective view showing the underside structures of first to third fastening ribs in the motor assembly for a washing machine according to the first embodiment of the present invention.

As shown in FIGS. 1 and 2, a motor assembly for a washing machine according to a first embodiment of the present invention largely includes a stator core 100, upper and lower insulators 200 and 300, a first fastening rib 400, a second fastening rib 500, and a third fastening rib 600.

The stator core 100 is formed by laminating silicon steel plates onto top of each other and has a plurality of teeth 110 formed along the outer peripheral surface thereof so as to wind coils C thereon.

The upper and lower insulators 200 and 300 are made of synthetic resin having electric insulation properties and coupled to the upper and lower portions of the stator core 100 in such a manner as to surround the top and underside of the stator core 100.

Accordingly, the inner peripheral surface of the stator core 100 and the teeth 110 on which the coils C are wound are surrounded with the upper and lower insulators 200 and 300, thus preventing the coils C to which an electric current is applied from being directly contacted with the inner peripheral surface of the stator core 100 and the teeth 110.

The upper and lower insulators 200 and 300 are made of synthetic resin like polyacetal, polyoxymethylene, and so on, and they are separately made and coupled to the stator core 100. Otherwise, they may be integrally formed with the stator core 100 by means of insert molding.

The first fastening rib 400 protrudes from the inner peripheral surface of the lower insulator 300. The first fastening rib 400 is separately made and coupled to the inner peripheral surface of the lower insulator 300. Otherwise, the first fastening rib 400 may be integrally formed with the lower insulator 300 by means of insert molding.

The second fastening rib 500 protrudes from the inner peripheral surface of the upper insulator 200 in such a manner as to be coupled on the underside thereof to the top of the first fastening rib 400. In more detail, the second fastening rib 500 is formed at the corresponding position to the first fastening rib 400, and when the upper and lower insulators 200 and 300 are coupled to the stator core 100, the second fastening rib 500 is coupled to the first fastening rib 400.

So as to couple the second fastening rib 500 and the first fastening rib 400 to each other, the second fastening rib 500 has a plurality of first coupling protrusions 510 (See FIG. 2) protruding from the underside thereof, and the first fastening rib 400 has a plurality of first fastening pieces 410 protruding from the top thereof in such a manner as to have a plurality of coupling holes 411 formed thereon to insert the first coupling protrusions 510 thereinto.

Accordingly, if the first coupling protrusions 510 protruding from the underside of the second fastening rib 500 are inserted into the first coupling holes 411 of the first fastening pieces 410 formed on the top of the first fastening rib 400, the coupling between the first and second fastening ribs 400 and 500 is finished.

The third fastening rib 600 has a round shape and is coupled on the underside thereof to the top of the second fastening rib 500, while being coupled on the top thereof to the underside of a housing 10 in which various parts such as a brake drum and the like are mounted.

Accordingly, if the third fastening rib 600 is coupled to the underside of the housing 10, the upper and lower insulators 200 and 300 and the stator core 100 surrounded with the upper and lower insulators 200 and 300 are naturally coupled to the underside of the housing 10.

So as to prevent the underside of the housing 10 from being brought into contact with the top of the upper insulator 200 when the third fastening rib 600 is coupled to the underside of the housing 10, in this case, the top end periphery of the third fastening rib 600 desirably should protrude from the top of the upper insulator 200. Accordingly, the third fastening rib 600 has a plurality of equally spaced support members 610 extended downwardly from the underside thereof.

In this case, the support members 610 are coupled to the top of the second fastening rib 500. So as to conduct the coupling, a plurality of second coupling protrusions 611 protrudes from the underside of the support members 610, and the second fastening rib 500 has a plurality of flange portions 520 extended from the inner peripheral surface thereof in such a manner as to have a plurality of second coupling holes 521 formed thereon to insert the second coupling protrusions 611 thereinto.

Accordingly, if the second coupling protrusions 611 of the support members 610 are inserted into the second coupling holes 521 of the flange portions 520, the coupling between the third fastening rib 600 and the second fastening rib 500 is finished.

So as to couple the third fastening rib 600 to the underside of the housing 10, on the other hand, the first fastening rib 400 has a plurality of second fastening pieces 420 protruding from the top thereof in such a manner as to have a plurality of first coupling holes 421 formed thereon, and the third fastening rib 600 has a plurality of second fastening holes 620 communicating with the first fastening holes 421.

Fastening members like bushes A are inserted into the first fastening holes 421 and the second fastening holes 620, and bolts B are inserted into the bushes A and screw-coupled to the underside of the housing 10. Accordingly, if the top end portions of the bolts B are fastened to the screw holes formed on the underside of the housing 10, the top of the third fastening rib 600 comes into close contact with the underside of the housing 10 to cause the stator core 100 and the upper and lower insulators 200 and 300 to be coupled to the underside of the housing 10.

Accordingly, if the third fastening rib 600 is coupled to the underside of the housing 10 by means of the fastening members like the bushes A and the bolts B, a clutch assembly 20 having a switching gear 21 and a clutch lever 22 is located inside the first to third fastening ribs 400 to 600, so that the whole coupling structure of the washing machine can be substantially compact.

FIG. 3 is an exploded perspective view showing a hall sensor assembly in the motor assembly for a washing machine according to the first embodiment of the present invention.

On the other hand, a hall sensor assembly 700 is disposed on one side of the top of the upper insulator 200. As shown in FIG. 3, the hall sensor assembly 700 has a sensor cover 710 coupled to one side of the top of the upper insulator 200, a hall sensor 720 disposed on the top of the sensor cover 710 so as to sense the rotating speed of a rotor (not shown), and a power connector 730 disposed on one side of the sensor cover 710 in such a manner as to be connected to external power.

The hall sensor assembly 700 serves to supply the external power fed through the power connector 730 to the coils C wound around the teeth 110 of the stator core 100, and if the positions of the magnets attached to the inner peripheral surface of the outer rotor surrounding the stator core 100 are sensed by means of the hall sensor 720, serves to transmit the sensed signal to a controller (not shown) through a signal transmitter 740 mounted on the hall sensor 720, thus controlling the rotation of the rotor by means of a motor controller.

In this case, a sensor cap 750 is coupled to the top of the sensor cover 710. The sensor cap 750 covers the top of the sensor cover 710 to protect the hall sensor 720 located on the top of the sensor cover 710 from external impacts and at the same time to prevent water from entering the hall sensor 720 and the power connector 730.

The sensor cap 750 is screw-coupled to the sensor cover 710. So as to conduct the coupling, the sensor cap 750 has first screw holes 751 formed thereon, into which the bolts B are inserted, and the sensor cover 710 has second screw holes 711 formed on the top thereof in such a manner as to communicate with the first screw holes 751.

So as to rigidly couple the sensor cap 750 to the sensor cover 710, further, the sensor cap 750 has fastening holes 752 formed on both side surfaces thereof, and the sensor cover 710 has fastening protrusions 712 formed on both side surfaces thereof in such a manner as to be inserted into the fastening holes 752 of the sensor cap 750.

In the state where the sensor cap 750 is located on the top of the sensor cover 710, if the top of the sensor cap 750 is pressurized, the fastening protrusions 712 formed on both side surfaces of the sensor cover 750 are inserted into the fastening holes 752 formed on both side surfaces of the sensor cap 750, and the sensor cap 750 is coupled to the top of the sensor cover 710.

FIG. 4 is an exploded perspective view showing the whole structure of a motor assembly for a washing machine according to a second embodiment of the present invention.

On the other hand, as shown in FIG. 4, a motor assembly for a washing machine according to a second embodiment of the present invention largely includes a stator core 100, upper and lower insulators 200 and 300, and a fourth fastening rib 800.

The structures of the stator core 100 and the upper and lower insulators 200 and 300 have been already explained, and therefore, only the fourth fastening rib 800 will be described hereinafter.

The fourth fastening rib 800 is extended upwardly from the inner peripheral surface of the upper insulator 200 and has a mounting surface D formed on the top thereof in such a manner as to be extended horizontally toward the center of the upper insulator 200 by a given length and to mount the underside of the housing 10 thereon.

The fourth fastening rib 800 has a plurality of third fastening holes 810 formed on the mounting surface D so as to insert fastening members thereinto.

Accordingly, after the underside of the housing 10 is mounted on the mounting surface D of the top of the fourth fastening rib 800, the fastening members are inserted into the third fastening holes 810, and thus, the fourth fastening rib 800 is coupled to the underside of the housing 10, so that the upper and lower insulators 200 and 300 and the stator core 100 surrounded with the upper and lower insulators 200 and 300 are coupled to the underside of the housing 10.

Of course, the fastening members like the bushes A as described above are inserted into the third fastening holes 810, and bolts are inserted into the bushes A and fastened to the screw holes formed on the underside of the housing 10.

On the other hand, the fourth fastening rib 800 has a plurality of reinforcing ribs 820 formed along the inner peripheral surface thereof. The reinforcing ribs 820 serve to increase the whole strength of the fourth fastening rib 800, to stably maintain the coupled state of the fourth fastening rib 800 to the underside of the housing 10, and to prevent the fourth fastening rib 800 from being broken due to external impacts.

While the present invention has been described with reference to the particular illustrative embodiments, it is not to be restricted by the embodiment but only by the appended claims. It is to be appreciated that those skilled in the art can change or modify the embodiments without departing from the scope and spirit of the present invention.

The invention claimed is:

1. A motor assembly for a washing machine, comprising:
   a stator core having a plurality of teeth formed along the outer peripheral surface thereof in such a manner as to wind coils thereon;
   upper and lower insulators coupled to the upper and lower portions of the stator core in such a manner as to surround the top and underside of the stator core;
   a first fastening rib protruding from the inner peripheral surface of the lower insulator; a second fastening rib protruding from the inner peripheral surface of the upper insulator in such a manner as to be coupled on the underside thereof to the top of the first fastening rib;
   and a round-shaped third fastening rib having the underside coupled to the top of the second fastening rib and the top protruding from the top of the upper insulator in such a manner as to be coupled to the underside of a housing in which various parts such as a brake drum are mounted, wherein the third fastening rib has a plurality of equally spaced support members extended downwardly from the underside thereof in such manner as to be coupled to the top of the second fastening rib, and wherein the support members has a plurality of second coupling protrusions formed on the underside thereof, and the second fastening rib has a plurality of flange portions extended from the inner peripheral surface thereof in such a manner as to have a plurality of second coupling holes formed thereon to insert the second coupling protrusions thereinto.

2. The motor assembly for a washing machine according to claim 1, wherein the second fastening rib has a plurality of first coupling protrusions protruding from the underside thereof, and the first fastening rib has a plurality of first fastening pieces protruding from the top thereof in such a manner as to have a plurality of coupling holes formed thereon to insert the first coupling protrusions thereinto.

3. The motor assembly for a washing machine according to claim 1, wherein the first fastening rib has a plurality of second fastening pieces protruding from the top thereof in such a manner as to have a plurality of first coupling holes formed thereon, and the third fastening rib has a plurality of second fastening holes communicating with the first fastening holes.

4. The motor assembly for a washing machine according to claim 1, further comprising:
a sensor cover coupled to one side of the top of the upper insulator;
a hall sensor disposed on the top of the sensor cover so as to sense the rotating speed of a rotor; a power connector disposed on one side of the sensor cover in such a manner as to be connected to external power; and
a sensor cap covering the top of the sensor cover so as to prevent water from entering the hall sensor and the power connector.

\* \* \* \* \*